(12) United States Patent
Baba et al.

(10) Patent No.: US 7,182,144 B2
(45) Date of Patent: Feb. 27, 2007

(54) FIRE-FIGHTING ROBOT

(75) Inventors: Katsuyuki Baba, Kitakyushu (JP); Shigeaki Ino, Kitakyushu (JP); Yoichi Takamoto, Kitakyushu (JP); Yasunari Motoki, Kitakyushu (JP); Masao Mori, Kitakyushu (JP); Keiichi Kido, Kitakyushu (JP); Yuichi Arimura, Kitakyushu (JP)

(73) Assignee: TMSUK Co., Ltd., Fukuoka (JP)

( * ) Notice: Subject to any disclaimer, the term of this patent is extended or adjusted under 35 U.S.C. 154(b) by 0 days.

(21) Appl. No.: 10/566,706

(22) PCT Filed: Aug. 21, 2003

(86) PCT No.: PCT/JP03/10577

§ 371 (c)(1),
(2), (4) Date: Feb. 1, 2006

(87) PCT Pub. No.: WO2005/018749

PCT Pub. Date: Mar. 3, 2005

(65) Prior Publication Data

US 2006/0185858 A1 Aug. 24, 2006

(51) Int. Cl.
*A62C 27/00* (2006.01)
(52) U.S. Cl. .............. 169/52; 169/88; 169/63; 169/21; 239/69; 239/172
(58) Field of Classification Search .............. 169/52, 169/60, 63, 51, 21, 19, 88; 239/69, 172
See application file for complete search history.

(56) References Cited

U.S. PATENT DOCUMENTS 3,613,461 A * 10/1971 Cholin et al. ............. 74/2
3,768,567 A * 10/1973 Weise ..................... 169/26
4,265,316 A * 5/1981 Fee ....................... 169/19

FOREIGN PATENT DOCUMENTS

| JP | 59-69752 U | | 5/1984 |
|---|---|---|---|
| JP | 60-24854 A | | 2/1985 |
| JP | 3-85054 U | | 8/1991 |
| JP | 6-79011 | * | 3/1994 |
| JP | 6-79011 A | | 3/1994 |
| JP | 7-164374 | * | 6/1995 |
| JP | 10-57515 A | | 3/1998 |
| JP | 10-127808 A | | 5/1998 |
| JP | 10-1278008 | * | 5/1998 |
| JP | 2000-126324 A | | 5/2000 |
| JP | 2000-126324 | * | 9/2000 |

\* cited by examiner

*Primary Examiner*—Kevin Shaver
*Assistant Examiner*—Trevor McGraw
(74) *Attorney, Agent, or Firm*—Sughrue Mion, PLLC

(57) ABSTRACT

Provided is a fire-fighting robot that can quickly start to fight a fire occurring at a hazardous location, which firefighters cannot access, and extinguish fires occurring at any location without receiving a supply of fire extinguishing water.

The fire-fighting robot (1) of the present invention is self-propelled and remote-controlled via wireless or mobile communications to fight a fire. The robot includes one or more fire extinguisher storage portions (24a, 24b) for storing fire extinguishers (24c, 24d) which provide a jet of a fire-fighting agent from a jet outlet (26) by depressing a lever, a jet control portion disposed in the fire extinguisher storage portion (24a, 24b) for depressing the lever, and a jet outlet securing portion (26a) for detachably securing the jet outlet (26) of the fire extinguisher (24c, 24d).

5 Claims, 6 Drawing Sheets

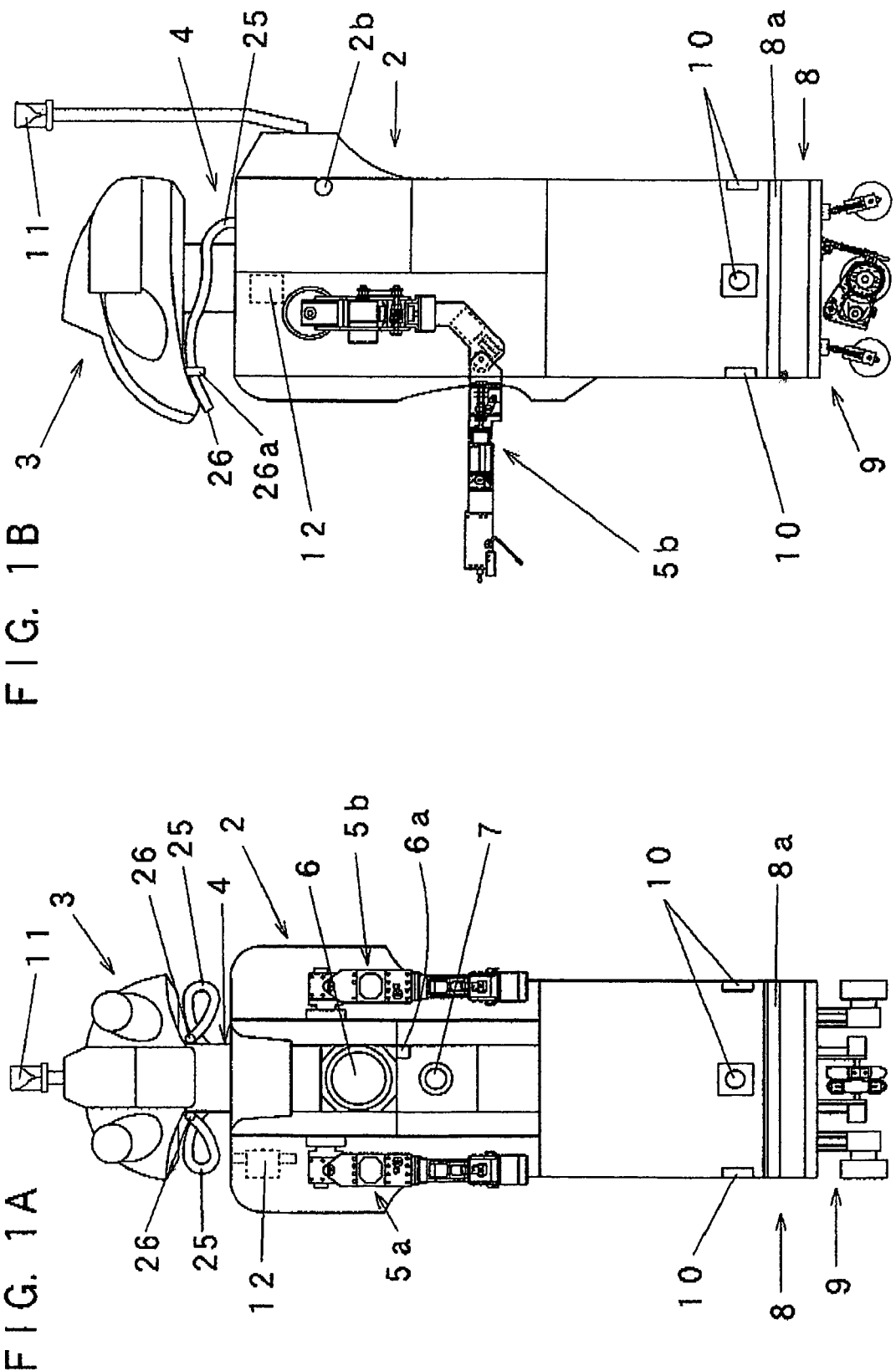

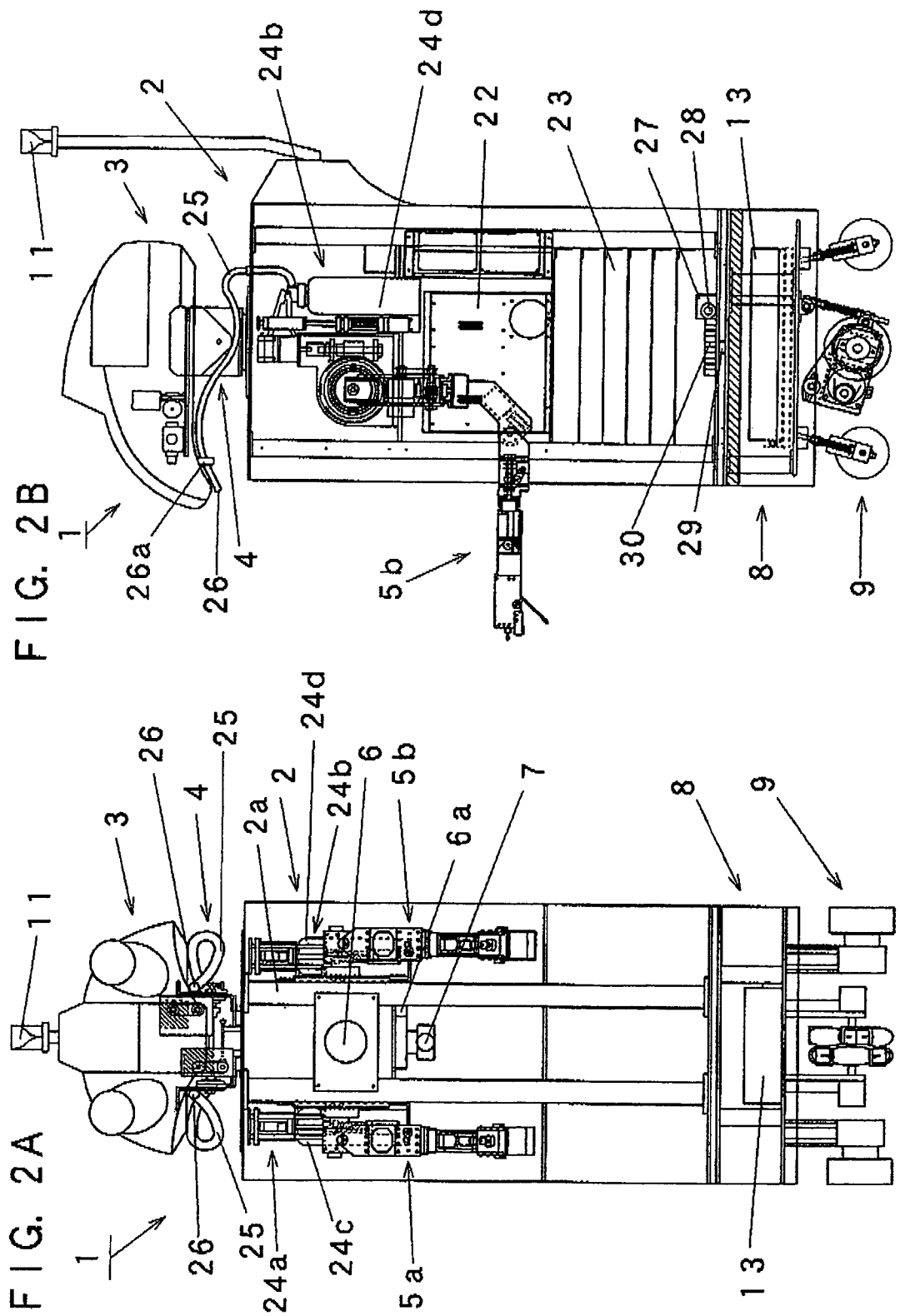

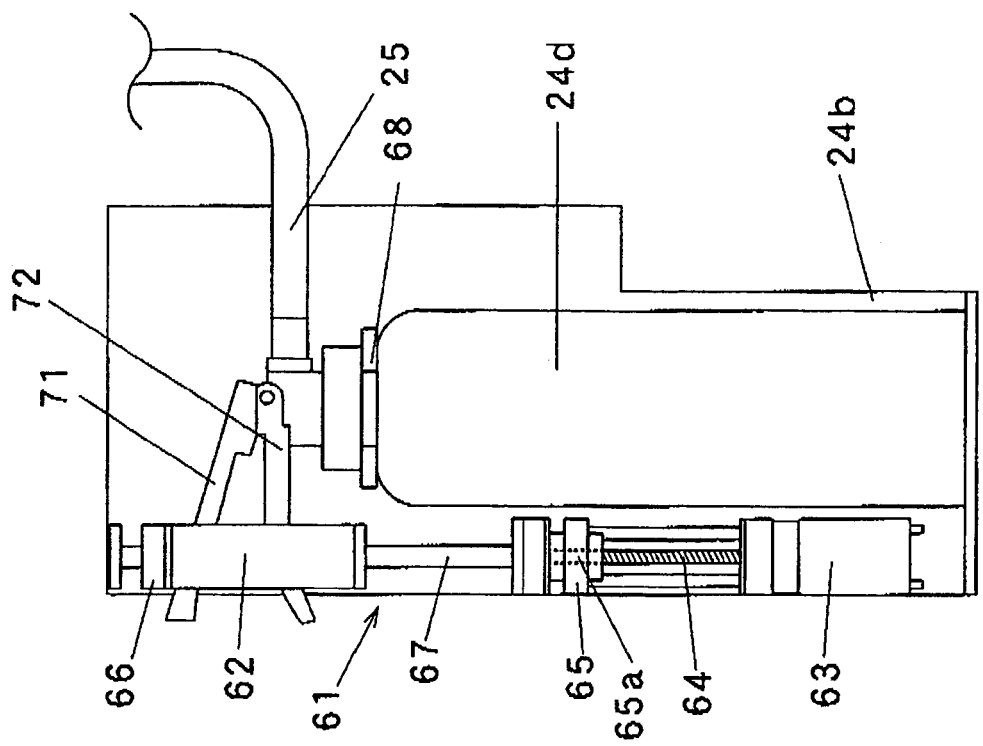
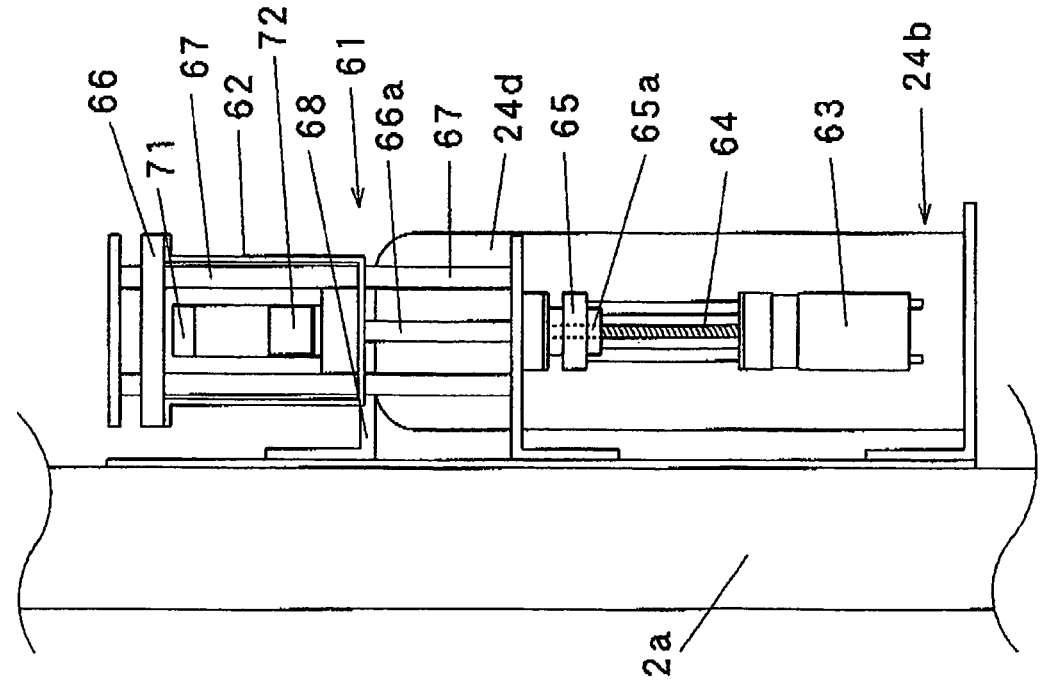

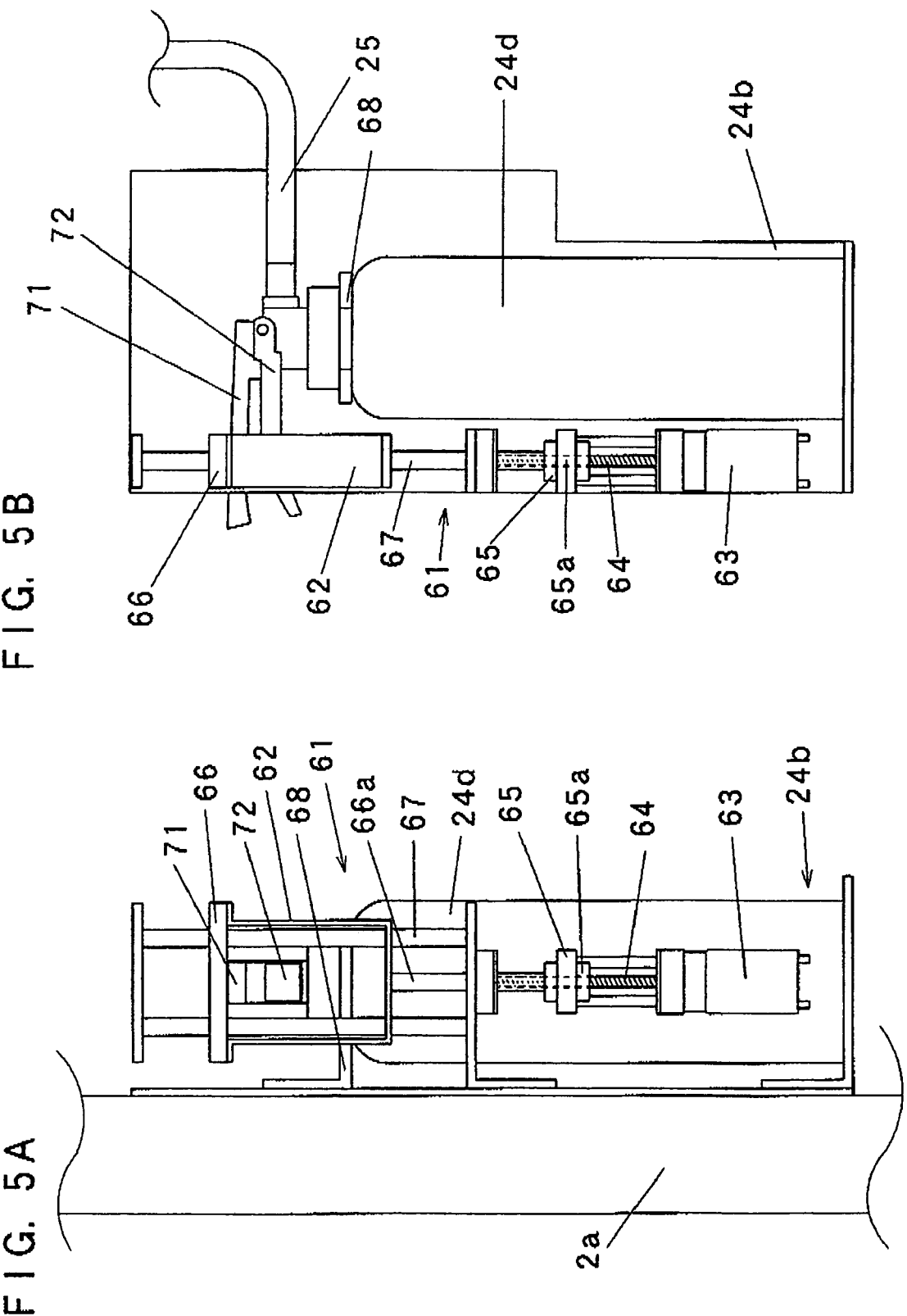

FIRE-FIGHTING ROBOT

FIELD OF THE INVENTION

The present invention relates to a self-propelled fire-fighting robot which can be remote-controlled via wireless or mobile communications to fight a fire.

BACKGROUND OF THE INVENTION

Recently, fire-fighting robots that are remote-controlled by radio or the like are used in order to fight a fire at such a location that is too hazardous to access by a firefighter for fighting the fire source.

As such a fire-fighting robot, fire-fighting equipment is disclosed in Japanese Published Unexamined Patent Application Hei-6-79011 (hereinafter referred to as Patent Document 1). "The fire-fighting equipment equipped with a self-propelled water spray system is characterized by including one or more water supply systems which are permanently installed in wall surfaces or the like within a fire-fighting area to receive a supply of fire extinguishing water under pressure from fire pump equipment, and a water spray system capable of being self-propelled which moves to the location of the aforementioned water supply system installed near the location of occurrence of a fire to connect its own water supply inlet thereto, thereby receiving a supply of fire extinguishing water under pressure for spray."

However, the aforementioned conventional technology has the following problems:

(1) According to the technology disclosed in Patent Document 1, the fire extinguishing water needs to be supplied uninterruptedly from the water supply system to the self-propelled water spray system via the water supply inlet. During spraying of water, the water spray system thus cannot move away from the location of the water supply system, so that when the location of a fire source is distant from the water supply system, the water must be sprayed thereon at a distance. Accordingly, there was a problem that such a fire could not be extinguished with reliability.

(2) Additionally, the fire extinguishing water needs to be supplied uninterruptedly from the water supply system to the self-propelled water spray system via the water supply inlet, and the water is sprayed along a straight line. Thus, there was another problem that a fire that occurs at a location where no water supply system is available or in a winding corridor cannot be fought.

The present invention was developed in view of the aforementioned problems. It is therefore an object of the present invention to provide a fire-fighting robot which can quickly start to fight a fire occurring at a hazardous location which firefighters cannot access, and fight a fire occurring at any location without receiving a supply of fire extinguishing water.

DISCLOSURE OF THE INVENTION

To achieve the aforementioned objects, the fire-fighting robot according to the present invention is configured as follows.

The fire-fighting robot of the present invention is self-propelled and remote-controlled via wireless or mobile communications to fight a fire. The fire-fighting robot includes a barrel portion, and one or more fire extinguisher storage portions disposed in the barrel portion for storing a fire extinguisher which provides a jet of a fire-fighting agent from a jet outlet by depressing a lever, a jet control portion disposed in the fire extinguisher storage portion for depressing the lever, and a head portion disposed to be capable of swiveling laterally and tilting vertically on top of the barrel portion, a jet outlet securing portion disposed at the head portion for detachably securing the jet outlet of the fire extinguisher, and a remote control camera disposed in the head portion to orient in the same direction as the direction of the jet of the fire-fighting agent from the jet outlet.

This arrangement provides the following features.

(1) The provision of the fire extinguisher storage portion allows for storing a commercially available fire extinguisher therein and locating the lever of the fire extinguisher at a contact portion of the jet control portion. This allows for depressing the lever of the fire extinguisher by the jet control portion, thereby supplying a jet of the fire-fighting agent from the jet outlet to fight a fire.

(2) The mounting of a fire extinguisher for supplying a jet of the fire-fighting agent makes it possible to fight a fire at any location such as a location where no water supply system is available.

(3) Use of the inner pressure of a fire extinguisher for expelling the fire-fighting agent eliminates the need for providing additional power for supplying a jet of the agent. This allows the robot to be simplified in structure and easily manufactured at reduced costs.

(4) The provision of the fire extinguisher storage portion for storing a fire extinguisher allows for using a general-purpose fire extinguisher. A used fire extinguisher can also be readily replaced with a new one, thus providing improved usability.

(5) When the location of a fire source such as a small fire is detected during movement of the robot, the robot can access the location of the fire and then supply a jet of a fire-fighting agent to extinguish the fire. The fire-fighting is thus quickly performed at an early stage, thereby making it possible to prevent the spread of the fire.

(6) The head portion can be swiveled laterally and tilted vertically, thereby orienting the jet outlet in any direction and allowing a jet of the fire-fighting agent to be directed in any direction. It is thus possible to fight a fire source at any location such as on the floor of a fire source or on the ceiling of a fire source.

(7) The remote control camera is oriented in the same direction as the direction of the jet of the fire-fighting agent from the jet outlet. This enables the operator performing the remote control to fight a fire source while viewing by means of the remote control camera whether the jet of the fire-fighting agent is directed to the location of the fire source. Thus, the fire fighting can be performed with reliability.

The fire-fighting robot of the present invention can have the following structure. That is, the fire-fighting robot includes a right-side fire extinguisher storage portion disposed on the right side of the barrel portion and a left-side fire extinguisher storage portion disposed on the left side of the barrel portion, wherein the jet control portion is disposed in each of the right-side fire extinguisher storage portion and the left-side fire extinguisher storage portion.

This arrangement provides the following features in addition to those discussed above.

(1) The provision of the right-side fire extinguisher storage portion and the left-side fire extinguisher storage portion allows for storing a commercially available fire extinguisher therein and locating the lever of the fire extinguisher at a contact portion of the jet control portion in the right- and left-side fire extinguisher storage portions. This makes it possible to depress the lever of the fire extinguisher by the jet control portion, thereby supplying a jet of the fire-fighting agent from the jet outlet to fight a fire.

The fire-fighting robot of the present invention can have the following structure. That is, the jet control portion includes a lever depressing portion for depressing the lever in the direction of the lever being gripped, a depressing portion support member for slidably supporting the lever depressing portion, a movable portion coupled to the lever depressing portion via a coupling shaft and having a female screw hole with a female screw formed therein, a threaded shaft to be screwed into the female screw hole of the movable portion, and a drive motor for rotating the threaded shaft.

This arrangement provides the following feature in addition to those discussed above.

(1) To expel the fire-fighting agent, the drive motor is activated to rotate the threaded shaft, so that the movable portion screwed onto the threaded shaft is displaced in the direction of the lever being gripped. The lever depressing portion operatively slides along the depressing portion support member to depress the lever in the direction of the lever being gripped, thereby making it possible to supply a jet of the fire-fighting agent by means of the fire extinguisher.

(2) The threaded shaft rotated by the drive motor and the movable portion having the female screw hole screwed onto the threaded shaft can be used to exert a strong depressing force on the lever and thereby depress the lever. It is thus ensured that the lever of the fire extinguisher is depressed to expel the fire-fighting agent.

The fire-fighting robot can have the following structure. That is, the robot includes a camera motor for vertically swiveling the remote control camera independently with respect to the head portion.

This arrangement provides the following feature in addition to those obtained discussed above.

(1) Since the remote control camera can be vertically swiveled independently with respect to the head portion, the operator performing the remote control can have an increased range of view for checking.

The fire-fighting robot of can have the following structure in the robot. That is, the fire extinguisher storage portion includes a fire extinguisher securing board for fixedly supporting an upper portion of the fire extinguisher.

This arrangement provides the following features in addition to those discussed above.

(1) Since the fire extinguisher can be fixed and stored in the fire extinguisher storage portion by means of the fire extinguisher securing board, it is possible to prevent the fire extinguisher from being dislodged or the lever from being accidentally actuated, which may be caused by vibrations or the like during traveling of the fire-fighting robot.

BRIEF DESCRIPTION OF THE DRAWINGS

FIG. 1A is a front view showing a fire-fighting robot according to a first embodiment;

FIG. 1B is a side view showing the fire-fighting robot according to the first embodiment;

FIG. 2A is a perspective front view showing the main portion of the fire-fighting robot according to the first embodiment;

FIG. 2B is a perspective side view showing the main portion of the fire-fighting robot according to the first embodiment;

FIG. 4A is a front view showing the main portion of a fire extinguisher storage portion;

FIG. 4B is a side view showing the main portion of the fire extinguisher storage portion;

FIG. 5A is a front view showing the main portion of the fire extinguisher storage portion when the lever is actuated;

FIG. 5B is a side view showing the main portion of the fire extinguisher storage portion when the lever is actuated;

DETAILED DESCRIPTION OF PREFERRED EMBODIMENTS

First Embodiment

Figure 3A:
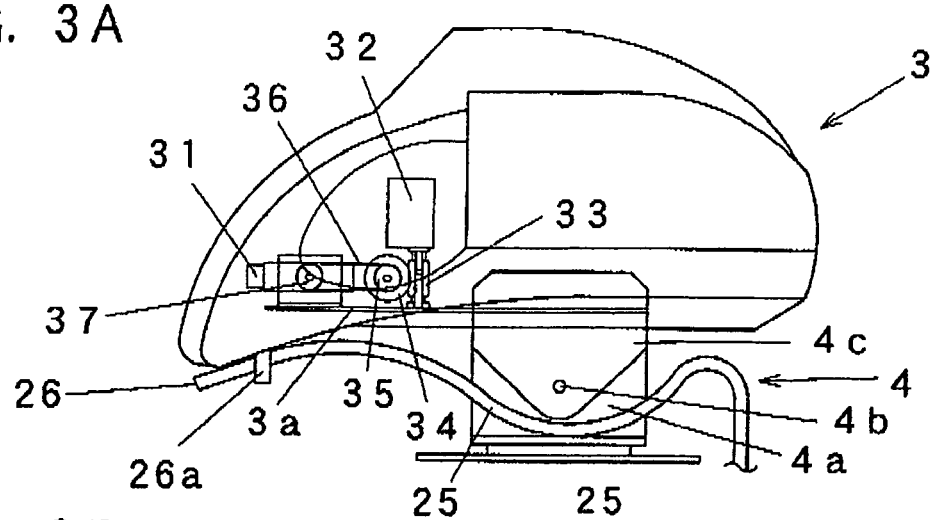
FIG. 3A is a perspective side view showing the main portion of a head portion.

A fire-fighting robot according to the first embodiment of the present invention will be described below with reference to the accompanying drawings.

FIG. 1A is a front view showing a fire-fighting robot according to the first embodiment. FIG. 1B is a side view showing the fire-fighting robot according to the first embodiment. FIG. 2A is a perspective front view showing the main portion of the fire-fighting robot according to the first embodiment. FIG. 2B is a perspective side view showing the main portion of the fire-fighting robot according to the first embodiment.

Illustrated in the drawings are: a fire-fighting robot 1 according to the first embodiment; a barrel portion 2 of the fire-fighting robot 1; a support frame 2a for supporting an arm portion, a neck portion or the like, to be described later, disposed on the barrel portion 2; a door portion 2b disposed on a side of the barrel portion 2 for storing a fire extinguisher, to be described later, in a fire extinguisher storage portion, to also be described later; a head portion 3 of the fire-fighting robot 1; a neck portion 4 for supporting the head portion 3 on top of the barrel portion 2; a right arm portion 5a disposed at the front of the right-hand side of the barrel portion 2; a left arm portion 5b disposed at the front of the left-hand side of the barrel portion 2; a speaker portion 6 disposed on the front of the barrel portion 2; a microphone portion 6a; an image capturing portion 7 disposed on the front of the barrel portion 2 below the speaker portion 6; a waist portion 8 disposed at a lower portion of the barrel portion 2; a tape-shaped contact sensor 8a wound around the waist portion 8; a traveling portion 9 for allowing the fire-fighting robot 1 to travel; an ultrasonic sensor 10 for sensing obstacles; an omnidirectional camera 11 secured to the barrel portion 2 and disposed at an upper portion of the head portion 3; a flame/smoke detecting sensor 12; a battery storage portion 13 for storing a battery; a bus box 22 serving as an extension board of a controller portion; a controller portion 23 for providing control to the whole robot and images; a right-side fire extinguisher storage portion 24a disposed on the right-hand side of the barrel portion 2 at the back of the right arm portion 5a; a left-side fire extinguisher storage portion 24b disposed on the left-hand side of the barrel portion 2 at the back of the left arm portion 5b; fire extinguishers 24c and 24d disposed respectively on the right-side fire extinguisher storage portion 24a and the left-side fire extinguisher storage portion 24b; a hose 25 connected to the fire extinguishers 24c and 24d; a fire-fighting agent jet outlet 26 disposed on the distal end of the hose 25; a jet outlet securing portion 26a disposed on the front of the head portion 3 for detachably securing the jet outlet 26; a waist motor 27 for swiveling the barrel portion 2 with respect to the waist portion 8; a worm gear 28 disposed on the motor shaft of the waist motor 27; a waist shaft 29 secured to the waist portion 8; and a worm wheel 30 secured to the waist shaft 29 and meshed with the worm gear 28.

The fire-fighting robot 1 can travel by the traveling portion 9 to patrol a building or the like. When the fire-fighting robot 1 has detected a fire during the patrol or sensed a flame or smoke by the flame/smoke detecting sensor 12, the robot informs the operator or the like who is on standby elsewhere of the information. When the fire-fighting robot 1 has detected a person collapsed on a floor, an injured person, an intruder or the like during a patrol, the operator being on standby elsewhere can talk to the person collapsed on the floor, the injured person, the intruder or the like using the speaker portion 6 and the microphone portion 6a.

The barrel portion 2 is disposed to be capable of swiveling relative to the waist portion 8. The contact sensor 8a is wound around the waist portion 8 to sense an obstacle being brought into contact with the robot 1. The ultrasonic sensor 10 senses an obstacle around the robot and an intruder or the like approaching the robot. The omnidirectional camera 11 takes pictures of the surrounding of the patrol robot 1 from the upper portion of the head portion 3. The images taken are sequentially stored in a memory portion (not shown) disposed in the head portion 3.

Next, the head portion of the fire-fighting robot will be described with reference to the drawings.

Figure 3B:
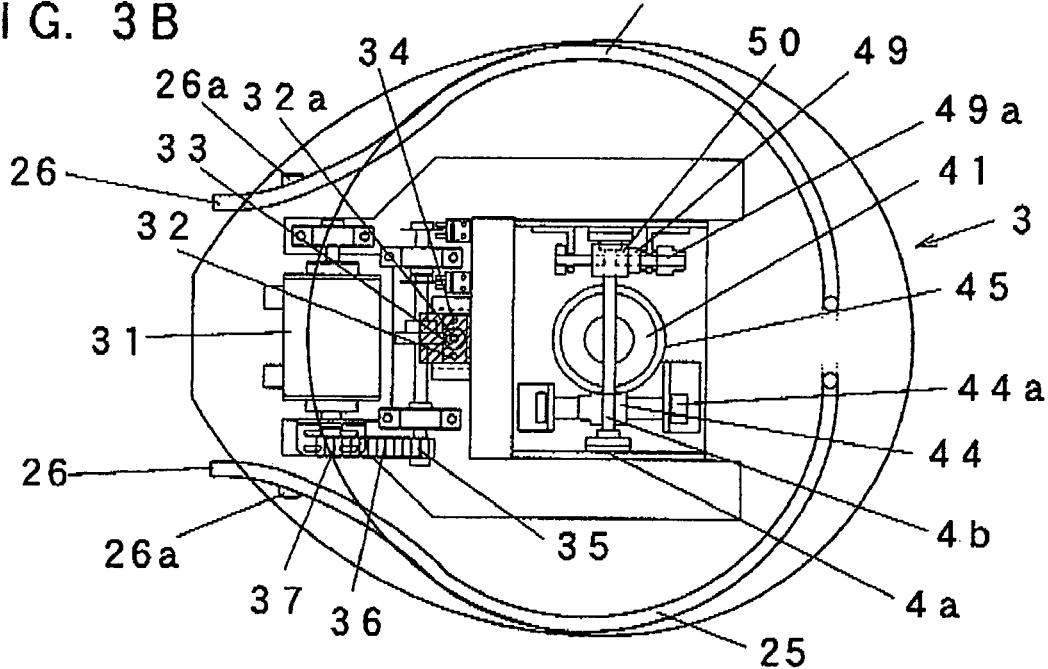
FIG. 3B is a perspective plan view showing the main portion of the head portion.
Figure 3C:
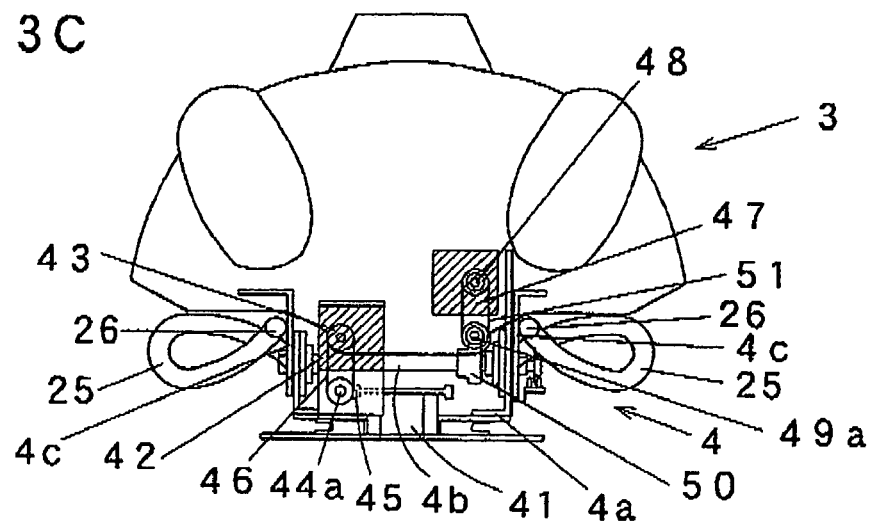
FIG. 3C is a perspective rear view showing the main portion of the head portion.

FIG. 3A is a perspective side view showing the main portion of the head portion. FIG. 3B is a perspective plan view showing the main portion of the head portion. FIG. 3C is a perspective rear view showing the main portion of the head portion.

Illustrated in the drawings are: the head portion 3; a head portion plate 3a disposed in the head portion 3; the hose 25; the jet outlet 26; the jet outlet securing portion 26a; a remote control camera 31 disposed on the head portion plate 3a to be capable of tilting vertically; a camera motor 32 for tilting the remote control camera 31 vertically; a worm gear 33 disposed on the motor shaft of the camera motor 32; a worm wheel 34 meshed with the worm gear 33; a band-wheel 35 operatively rotated with the worm wheel 34; a timing belt 36 looped over the band wheel 35 and a band wheel 37, to be described later; the band wheel 37 operatively rotated with the remote control camera 31; the neck portion 4; a barrel-side neck portion frame 4a; a fixed shaft 4b secured to the barrel-side neck portion frame 4a; a head-side neck portion frame 4c journaled on the fixed shaft 4b; a neck shaft 41 secured on top of the barrel portion 2; a lateral motor 42 for laterally swiveling the head portion 3; a band wheel 43 secured to the motor shaft of the lateral motor 42; a worm gear 44; a band wheel 44a operatively rotated in conjunction with the worm gear 44; a worm wheel 45 secured around the neck shaft 41 for meshing with the worm gear 44; a timing belt 46 looped over the band wheel 43 and the band wheel 44a; a vertical motor 47 for vertically swiveling the head portion 3; a band wheel 48 disposed on the motor shaft of the vertical motor 47; a worm gear 49; a band wheel 49a operatively rotated in conjunction with the worm gear 49; a worm wheel 50 secured to the fixed shaft 4b for meshing with the worm gear 49; and a timing belt 51 looped over the band wheel 48 and the band wheel 49a.

The remote control camera 31 is rocked vertically by the camera motor 32 being activated. The head portion 3 is laterally swiveled about the neck shaft 41 by the lateral motor 42 being activated. The head portion 3 is tilted vertically about the fixed shaft 4b by the vertical motor 47 being activated. In this manner, the head portion 3 can be oriented in a given direction, so that the remote control camera 31 disposed on the front portion of the head portion 3 is oriented in a desired direction. Since the remote control camera 31 can be swiveled independently in the vertical direction, the operator performing the remote control can have a further increased range of view for checking.

Furthermore, the head portion 3 can be swiveled laterally or tilted vertically, there by allowing the jet outlet 26 secured to the jet outlet securing portion 26a disposed on the front portion of the head portion 3 to be oriented in a given direction. This allows the fire-fighting agent to be sprayed from the jet outlet 26 in a given direction, thereby making it possible to fight a fire source occurring at any location such as on the floor of a fire source or on the ceiling of a fire source. It is also possible for the operator performing the remote control to fight a fire while visually checking by means of the remote control camera 31 whether the jet of the fire-fighting agent is directed to the location of the fire source. Thus, the fire fighting can be performed with reliability.

Next, the fire extinguisher storage portion will be described with reference to the drawings.

FIG. 4A is a front view showing the main portion of the fire extinguisher storage portion. FIG. 4B is a side view showing the main portion of the fire extinguisher storage portion. FIG. 5A is a front view showing the main portion of the fire extinguisher storage portion when the lever is actuated. FIG. 5B is a side view showing the main portion of the fire extinguisher storage portion when the lever is actuated. In the first embodiment, a description will be made of the left-side fire extinguisher storage portion 24b, and explanation will not be given to the right-side fire extinguisher storage portion 24a because it is configured in the same manner.

In the drawings, illustrated are: the support frame 2a; the left-side fire extinguisher storage portion 24b; a fire extinguisher 24d; the hose 25; a jet control portion 61 disposed in the left-side fire extinguisher storage portion 24b; a lever storage portion 62 for storing the lever portion of the fire extinguisher 24d; a drive motor 63; a threaded shaft 64 consecutively provided to the motor shaft of the drive motor 63; a movable portion 65 having a female screw hole 65a screwed on to the threaded shaft 64; a lever depressing portion 66 secured to the movable portion 65 via the lever storage portion 62 coupled to a coupling member 66a; a depressing portion support member 67 secured to the support frame 2a for slidably supporting the lever depressing portion 66 in the vertical direction; a fire extinguisher securing board 68 secured to a support frame 60 for sandwiching the upper portion of the fire extinguisher 24d so as to fixedly support it; a lever 71 of the fire extinguisher 24d for spraying the fire-fighting agent by being depressed downwardly; and a lever support portion 72 disposed opposite the lower portion of the lever 71 for supporting the fire extinguisher 24d.

A description will be made as to how the fire-fighting robot operates which is configured as described above according to the first embodiment.

To mount the fire extinguisher 24d to the fire-fighting robot 1 or replace the fire extinguisher 24d, the door portion 2b described referring to FIG. 1 is opened to store the fire extinguisher 24d in the fire extinguisher storage portion 24b.

The fire-fighting agent is sprayed from the jet outlet 26 as described with reference to FIG. 3. This is performed when, for example, the operator performing the remote control detects the location of a fire source using the remote control camera, and transmits a command signal to the fire-fighting robot to spray the fire-fighting agent. Upon reception of the command signal for spraying the fire-fighting agent, the fire-fighting robot 1 drives the drive motor 63 to rotate the threaded shaft 64 in response to activating a lever 71 or fire extinguishing control mechanism, which is coupled to the fire extinguisher, thereby causing the movable portion 65 screwed onto the threaded shaft 64 to be displaced downwardly. The displacement of the movable portion 65 causes the lever depressing portion 66 secured to the lever storage portion 62 coupled to the coupling member 66a to slide downwardly along the depressing portion support member 67. This ensures that the lever depressing portion 66 can depress the lever 71 downwardly. The fire extinguisher 24d is secured to the left-side fire extinguisher storage portion 24b by means of the fire extinguisher securing board 68. This makes it possible to prevent the fire extinguisher 24d from being dislodged or the lever 71 from being accidentally actuated, which may be caused by vibrations or the like during traveling of the robot.

The movable portion 65 is screwed onto the threaded shaft 64 by means of the female screw hole 65a, and displaced downwardly by the threaded shaft 64 being rotated. Accordingly, a strong depressing force can be exerted on the lever 71 by means of the lever depressing portion 66 via the coupling member 66a, thereby ensuring that the lever 71 of the fire extinguisher 24d is depressed to expel the fire-fighting agent.

In this manner, as shown in FIG. 5, the lever 71 is depressed by means of the lever depressing portion 66 downwardly, i.e., in the direction of the lever 71 being gripped. It is thus made possible to spray the fire-fighting agent from the jet outlet 26 as described with reference to FIG. 3.

Next, the traveling portion will be described with reference to the drawings.

Figure 6A:
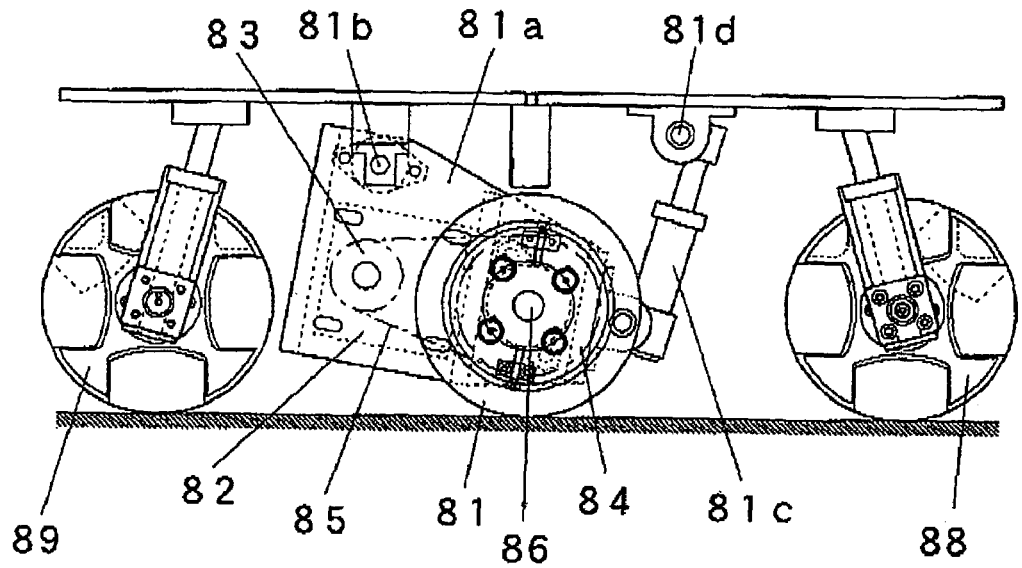
FIG. 6A is a side view showing a traveling portion.
Figure 6B:
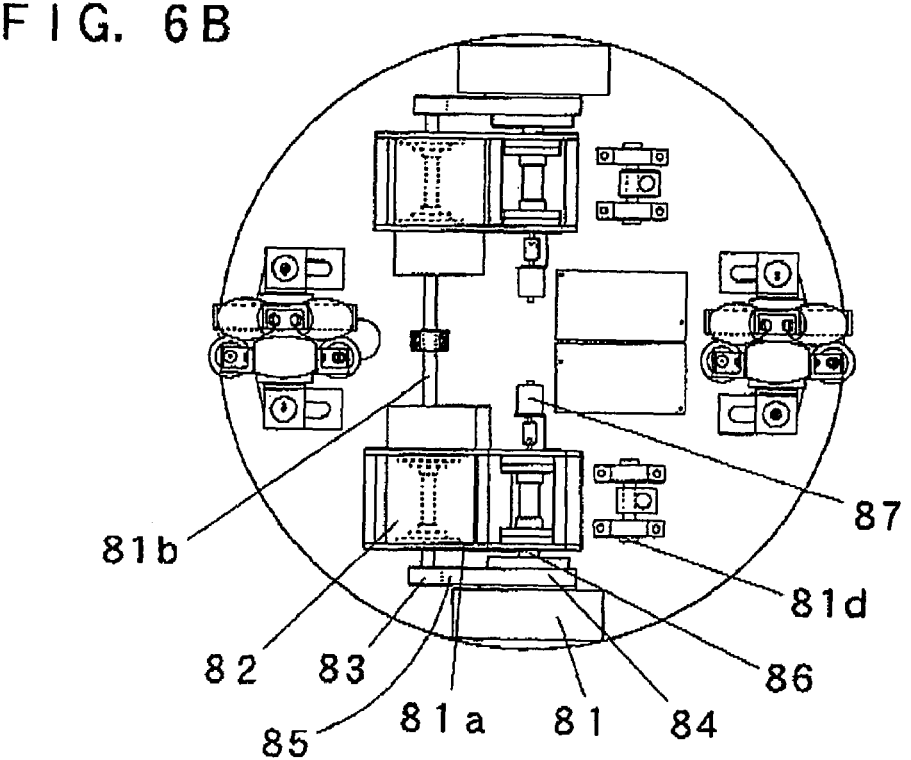
FIG. 6B is a bottom view showing the traveling portion.

FIG. 6A is a side view showing the traveling portion, and FIG. 6B is a bottom view showing the traveling portion. In the first embodiment, a description will be made of the left-side driving wheel, and description will not be given to the right-side driving wheel because it is configured in the same manner.

In the drawings, illustrated are: a driving wheel 81; a driving wheel frame 81a; a front-side journal portion 81b for journaling the front side of the driving wheel frame 81a; a shock absorber 81c; a rear-side journal portion 81d for journaling the rear side of the driving wheel frame 81a via the shock absorber 81c; a driving wheel drive motor 82 disposed on the driving wheel frame 81a for driving the driving wheel 81; a band wheel 83 disposed on the motor shaft of the driving wheel drive motor 82; a band wheel 84 operatively rotated in conjunction with the band wheel 83 via a timing belt 85; an axle shaft 86 of the driving wheel 81; a rotary encoder 87 for sensing the rotation of the axle shaft 86; a rear-wheel-side follower wheel 88, and a front-wheel-side follower wheel 89.

Activating the driving wheel drive motor 82 causes the driving wheel 81 to rotate and travel. The driving wheel 81 is journalled on the driving wheel frame 81a with the rotary encoder 87, while the front portion of the driving wheel frame 81a is journalled with the front-side journal portion 81b and the rear portion journalled with the rear-side journal portion 81d via the shock absorber 81c. This makes it possible to prevent vibrations during traveling or a load exerted on the traveling portion 9 from being transferred to the barrel portion 2 or the head portion 3. Additionally, during traveling, the rotary encoder 87 can detect the rotation of the driving wheel 81, and the resulting information can be analyzed at the controller portion or the like to calculate the distance of travel for use as auxiliary data or the like.

The fire-fighting robot according to the first embodiment is configured as described above, and has the following effects.

(1) The fire extinguisher 24d can be stored in the left-side fire extinguisher storage portion 24b to allow the jet control portion 61 to grasp the lever 71 of the fire extinguisher 24d, thereby spraying the fire-fighting agent from the jet outlet 26 to fight a fire. Additionally, the use of the fire extinguisher 24d makes it possible to fight a fire at any location such as a location where no water supply system is available. Use of the inner pressure of the fire extinguisher 24d for expelling the fire-fighting agent eliminates the need for providing additional power for supplying a jet of the agent. This allows the robot to be simplified in structure and easily manufactured. It is also possible to readily replace a used fire extinguisher with a new one.

(2) The head portion 3 can be swiveled laterally and tilted vertically, thereby orienting the jet outlet 26 in any direction and allowing a jet of the fire-fighting agent to be directed in any direction. It is thus possible to fight a fire at any location such as on the floor of a fire source or on the ceiling of a fire source. The remote control camera 31 is oriented in the same direction as the direction of the jet of the fire-fighting agent from the jet outlet 26. This enables the operator performing the remote control to fight a fire while visually checking by means of the remote control camera 31 whether the jet of the fire-fighting agent is directed to the location of the fire. Thus, the fire fighting can be performed with reliability.

(3) In the jet control portion 61, the threaded shaft 64 rotated by the drive motor 63 and the movable portion 65 having the female screw hole 65a screwed onto the threaded shaft 64 can be used to exert a strong depressing force on the lever 71 to depress the lever 71. It is thus ensured that the lever depressing portion 66 can depress the lever 71 of the fire extinguisher 24d to expel the fire-fighting agent.

(4) The fire-fighting robot 1 can travel by the traveling portion 9 to patrol a security service area such as a building. When the location of a fire source such as a small fire is detected during a patrol, the robot can access the location of the fire source and then supply a jet of a fire-fighting agent to extinguish the fire. The fire fighting is thus quickly performed at an early stage, thereby making it possible to prevent the spread of the fire.

INDUSTRIAL APPLICABILITY

The aforementioned fire-fighting robot of the present invention can provide the following advantageous effects.

According to an embodiment of the invention, a robot can be provided which realizes the following effects.

(1) The provision of the fire extinguisher storage portion allows for storing a commercially available fire extinguisher therein and locating the lever of the fire extinguisher at a contact portion of the jet control portion. This makes it possible to depress the lever of the fire extinguisher by the jet control portion, thereby supplying a jet of the fire-fighting agent from the jet outlet to fight a fire.

(2) The mounting of a fire extinguisher for supplying a jet of the fire-fighting agent makes it possible to fight a fire at any location such as a location where no water supply system is available.

(3) Use of the inner pressure of a fire extinguisher for expelling the fire-fighting agent eliminates the need for providing additional power for supplying a jet of the agent. This allows the robot to be simplified in structure and easily manufactured at reduced costs.

(4) The provision of the fire extinguisher storage portion for storing a fire extinguisher allows for using a general-purpose fire extinguisher. A used fire extinguisher can also be replaced readily with a new one, thus providing improved usability.

(5) When the location of a fire source such as a small fire is detected during movement of the robot, the robot can access the location of the fire source and then supply a jet of a fire-fighting agent to extinguish the fire. The fire fighting is thus quickly performed at an early stage, thereby making it possible to prevent the spread and development of the fire.

(6) The head portion can be swiveled laterally and tilted vertically, thereby orienting the jet outlet in any direction and allowing a jet of the fire-fighting agent to be directed in any direction. It is thus possible to fight a fire source at any location such as on the floor of a fire source or on the ceiling of a fire source.

(7) The remote control camera is oriented in the same direction as the direction of the jet of the fire-fighting agent from the jet outlet. This enables the operator performing the remote control to fight a fire source while visually checking by means of the remote control camera whether the jet of the fire-fighting agent is directed to the location of the fire source. Thus, the fire fighting can be performed with reliability.

According to an embodiment of the invention, a robot can be provided which realizes the following effects in addition to those discussed above.

(1) The provision of the right-side fire extinguisher storage portion and the left-side fire extinguisher storage portion allows for storing a commercially available fire extinguisher therein and locating the lever of the fire extinguisher at a contact portion of the jet control portion in the right- and left-side fire extinguisher storage portions. This makes it possible to depress the lever of the fire extinguisher by the jet control portion, thereby supplying a jet of the fire-fighting agent from the jet outlet to fight a fire.

According to an embodiment of the invention, the robot can be provided which realizes the following effect in addition to those discussed above.

(1) To expel the fire-fighting agent, the drive motor is activated to rotate the threaded shaft, so that the movable portion screwed onto the threaded shaft is displaced in the direction of the lever being gripped. The lever depressing portion operatively slides along the depressing portion support member to depress the lever in the direction of the lever being gripped, thereby making it possible to supply a jet of the fire-fighting agent from the fire extinguisher.

(2) The threaded shaft rotated by the drive motor and the movable portion having the female screw hole screwed onto the threaded shaft can be used to exert a strong depressing force on the lever to depress the lever. It is thus ensured that the lever of the fire extinguisher is depressed to expel the fire-fighting agent.

According to an embodiment of the invention, the robot can be provided which realizes the following effect in addition to those discussed above.

(1) Since the remote control camera can be vertically swiveled independently with respect to the head portion, the operator performing the remote control can have an increased range of view for checking.

According to an embodiment of the invention, the robot can be provided which realizes the following effect in addition to those discussed above.

(1) Since the fire extinguisher can be fixed and stored in the fire extinguisher storage portion by means of the fire extinguisher securing board, it is possible to prevent the fire extinguisher from being dislodged or the lever from being accidentally actuated, which may be caused by vibrations or the like during traveling of the fire-fighting robot.

What is claimed is:

1. A fire-fighting robot which is self-propelled and remote-controlled via wireless or mobile communications to fight a fire comprising
    a barrel portion,
    one or more fire extinguisher storage portions disposed in said barrel portion for storing a fire extinguisher which provides a jet of a fire-fighting agent from a jet outlet in response to activating a fire extinguisher control mechanism coupled to the fire extinguisher,
    a jet control portion disposed in said fire extinguisher storage portion for activating the fire extinguisher control mechanism,
    a head portion disposed to be capable of swiveling laterally and tilting vertically on top of said barrel portion,
    a jet outlet securing portion disposed at said head portion for detachably securing said jet outlet of said fire extinguisher, and
    a remote control camera disposed in said head portion to orient in the same direction as the direction of the jet of the fire-fighting agent from said jet outlet.

2. The fire-fighting robot according to claim 1, comprising
    a right-side fire extinguisher storage portion disposed on the right side of said barrel portion and a left-side fire extinguisher storage portion disposed on the left side of said barrel portion, wherein
    said jet control portion is disposed in each of said right-side fire extinguisher storage portion and said left-side fire extinguisher storage portion.

3. The fire-fighting robot according to claim 1 or 2, wherein the fire extinguisher control mechanism includes a lever attached to the fire extinguisher which when depressed causes the jet of fire fighting agent to be expelled from the jet outlet, and wherein the jet control portion comprises
    a lever depressing portion for depressing said lever in the direction of said lever being gripped,
    a depressing portion support member for slidably supporting said lever depressing portion,
    a movable portion coupled to said lever depressing portion via a coupling shaft and having a female screw hole with a female screw formed therein,
    a threaded shaft to be screwed into the female screw hole of said movable portion, and
    a drive motor for rotating said threaded shaft.

4. The fire-fighting robot according to claim 1, further comprising a camera motor for vertically swiveling said remote control camera independently with respect to said head portion.

5. The fire-fighting robot according to claim 1, wherein the fire extinguisher storage portion comprises a fire extinguisher securing board for fixing and supporting an upper portion of said fire extinguisher.

* * * * *